Patented Mar. 29, 1938

2,112,361

UNITED STATES PATENT OFFICE 2,112,361

SYNTHETIC TANS AND PROCESS OF PRODUCING THE SAME

Heinrich Fischer, Ludwigshafen-on-the-Rhine, Germany, assignor to I. G. Farbenindustrie Aktiengesellschaft, Frankfort-on-the-Main, Germany No Drawing. Application June 4, 1936, Serial No. 83,504. In Germany June 13, 1935

9 Claims. (Cl. 260—4)

This invention relates to synthetic tans and the process of producing the same.

It is known to produce condensation products having tanning action by condensing an aromatic hydroxy sulphonic acid with formaldehyde and an ammonia base.

I have now found that very valuable tanning agents which yield pale leathers of a specially good fastness to light and high fullness are obtained by condensing a water-soluble salt of a hydroxy sulphonic acid of an aliphatic-aromatic compound containing at least one hydroxy group combined to the aromatic radicle and at least one sulphonic group combined to the aliphatic radicle, or their homologues or derivatives with formaldehyde and an ammonia base. Suitable sulphonic acids of the said kind are for example para-hydroxybenzyl sulphonic acid, naphthol-methyl-sulphonic acids, para-dihydroxy-diphenyl-sulphone-methyl-sulphonic acid and the like. Compounds of the said kind may be obtained for example by causing formaldehyde and salts of sulphurous acid to act on phenols, naphthols, hydroxyanthracenes, dihydroxy-diphenyl-sulphones or dihydroxydiphenylmethanes. Instead of formaldehyde, substances yielding formaldehyde, such as formaldehyde bisulphite and methylene chloride, may be employed.

As ammonia bases suitable according to this invention may be mentioned for example ammonia, methylamine, dimethylamine, ethylamine, propylamine, butylamine, cyclohexylamine, dodecylamine and cetylamine. Instead of ammonia and formaldehyde, hexamethylene tetramine may be employed with special advantage.

The condensation of the reaction components is preferably carried out in aqueous solution and in the presence of caustic potash, caustic soda, calcium hydroxide, sodium carbonate, potassium carbonate or sodium acetate; it is advantageous to work at temperatures between about 80° and about 180° C. The period of time required for the condensation depends on the initial materials employed, on the temperature and on the concentration. When the reaction is completed, the reaction mixture is diluted with water and adjusted to the desired acidity suitable for tanning, by the addition of acids, as for example sulphuric acid. The resulting products may readily be obtained in the dry state by evaporation of the water, as for example in a Krause apparatus or on a roller dryer.

The tanning agents obtained in the said manner are water-soluble and are distinguished from the known synthetic tanning agents by a specially good fastness to light and a high plumping and fulling power. Leather tanned therewith has a very pale color.

The following examples will further illustrate how this invention may be carried out in practice but the invention is not restricted to these examples. The parts are by weight.

Example 1

85 parts of 30 per cent formaldehyde and 40 parts of 25 per cent ammonia are introduced into a solution which has been obtained by the action of calcined sodium sulphite and 30 per cent formaldehyde on 300 parts of 4,4'-dihydroxydiphenyl-sulphone and which consists mainly of an alkaline solution of the methylene sulphonic acid of the dihydroxydiphenyl-sulphone. The reaction mixture is boiled under reflux for 24 hours, then cooled and adjusted to the desired acidity by the addition of concentrated sulphuric acid. The methylene sulphonic acid may be in part replaced by other aromatic hydroxy sulphonic acids, as for example cresol sulphonic acid.

Example 2

192 parts of an aqueous 30 per cent formaldehyde solution and 162 parts of calcined sodium sulphite are reacted with 300 parts of 4,4'-dihydroxydiphenyl-sulphone at about 150° C., whereby an alkaline solution of the methylene sulphonic acid of the dihydroxydiphenyl-sulphone is obtained. 85 parts of 30 per cent formaldehyde and 70 parts of n-butylamine are added and the whole is heated to boiling under reflux for 7 hours. After cooling, the product obtained is adjusted to the desired acidity by the addition of sulphuric acid of 50° Bé. strength.

Example 3

50 parts of calcium oxide, 85 parts of 30 per cent formaldehyde and 40 parts of 25 per cent ammonia are added to the alkaline solution of the methylene sulphonic acid of dihydroxydiphenyl-sulphone obtained according to Example 2. The mixture obtained is heated to boiling for 7 hours under reflux, then cooled and adjusted to the desired acidity by the addition of sulphuric acid of 50° Bé. strength.

What I claim is:—

1. The process of producing synthetic tans which comprises reacting a water-soluble salt of a hydroxy sulphonic acid of an aliphatic-aromatic compound containing at least one hydroxy group combined to the aromatic radicle and at least one sulphonic acid group combined to the aliphatic radicle, with formaldehyde and an ammonia base.

2. The process of producing synthetic tans which comprises heating a water-soluble salt of a hydroxy sulphonic acid of an aliphatic-aromatic compound containing at least one hydroxy group combined to the aromatic radicle and at least one sulphonic acid group combined to the aliphatic radicle, with formaldehyde and an ammonia base at between about 80° and about 180° C.

3. The process of producing synthetic tans which comprises reacting a water-soluble salt of a hydroxy sulphonic acid of an aliphatic-aromatic compound containing at least one hydroxy group combined to the aromatic radicle and at least one sulphonic acid group combined to the aliphatic radicle, with formaldehyde and ammonia.

4. The process of producing synthetic tans which comprises reacting a water-soluble salt of a hydroxy sulphonic acid of an aliphatic-aromatic compound containing at least one hydroxy group combined to the aromatic radicle and at least one sulphonic acid group combined to the aliphatic radicle, with formaldehyde and an organic derivative of ammonia.

5. The process of producing synthetic tans which comprises reacting a water-soluble salt of a methylene sulphonic acid of an aromatic hydroxy compound with formaldehyde and an ammonia base.

6. Synthetic tans comprising a condensation product of a water-soluble salt of a hydroxy sulphonic acid of an aliphatic-aromatic compound containing at least one hydroxy group combined to the aromatic radicle and at least one sulphonic acid group combined to the aliphatic radicle, with formaldehyde and an ammonia base.

7. Synthetic tans comprising a condensation product of a water-soluble salt of a hydroxy sulphonic acid of an aliphatic-aromatic compound containing at least one hydroxy group combined to the aromatic radicle and at least one sulphonic acid group combined to the aliphatic radicle, with formaldehyde and ammonia.

8. Synthetic tans comprising a condensation product of a water-soluble salt of a hydroxy sulphonic acid of an aliphatic-aromatic compound containing at least one hydroxy group combined to the aromatic radicle and at least one sulphonic acid group combined to the aliphatic radicle, with formaldehyde and an organic derivative of ammonia.

9. Synthetic tans comprising a condensation product of a water-soluble salt of a methylene sulphonic acid of an aromatic hydroxy compound with formaldehyde and an ammonia base.

HEINRICH FISCHER.